United States Patent Office 3,164,596
Patented Jan. 5, 1965

3,164,596
NOVEL PROCESS FOR PREPARING HETERO-
CYCLIC COMPOUNDS
Irwin J. Pachter, Erdenheim, Pa., assignor to Smith Kline
& French Laboratories, Philadelphia, Pa., a corporation
of Pennsylvania
No Drawing. Filed Feb. 13, 1962, Ser. No. 172,888
8 Claims. (Cl. 260—251.5)

This invention relates to a novel process for preparing heterocyclic compounds possessing as an essential part of their nucleus a condensed aromatic 2-aminopyrazine structure. More precisely the heterocyclic compounds produced by the process of this invention have the following basic structure:

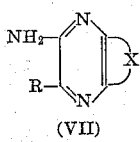

(VII)

in which X is an aromatic residue comprising as ring members carbon atoms and a maximum of 2 nitrogen atoms. Exemplary of the condensed aromatic rings claimed are those in which X taken together with the two aromatic carbon atoms to which it is attached represents a phenylene, naphthylidene, pyrimidinediyl and pyridinediyl moiety. As will be noted hereafter the basic structures described above can be optionally substituted by organic radicals unreactive under the reaction conditions described and common to the art such as hydroxyl, amino, lower alkylamino, diloweralkylamino, lower alkylthio, lower alkoxy, heterocyclic amino, alkyl, phenyl, thienyl, etc. groups. Such substitution will be made as desired by one skilled in the art using known synthetic methods to obtain compounds whose generic classes have utilities known to the art. These substituents do not affect the novel reaction of this invention except as described hereafter.

The term R denotes an alkyl or aryl moiety having a maximum of 12 carbon atoms. Exemplary of such groups are lower alkyl, cycloalkyl for instance cyclohexyl or cyclopentyl, phenyl, thienyl, lower alkoxy, phenoxy or carbamyl. The chemical character of R must be such that it is stable toward elimination during the cyclization step of the reaction. For example it has been found that when R is an aryl mercapto or lower alkyl mercapto moiety it is eliminated during cyclization to give the 2-acyl heterocyclic compound rather than the 2-mercapto derivatives.

The process of this invention has made possible production of heterocyclic compounds as discussed above in good yield and using nitrosoamines with easily prepared substituted ketones have a reactive α-methylene moiety.

The compounds produced by the process of this invention have various utilities. Most universal is their use in known reactions as intermediates for preparing medicinally active compounds. Many of the compounds, such as those in which X is phenylene or naphthylidene, have utility as nuclei for preparing dyestuffs or for their own inherent fluorescent or dyestuff character. Other products, such as those in which X is pyridinediyl or, especially pyrimidinediyl, have activity in themselves as medicinal agents such as diuretics, antihypertensives, vasodilators for instance coronary arterial dilators, antibacterials, anti-folic acid compounds or microorganism antagonists such as anti-*Lactobacillus casei*, *Streptococcus faecalis*, *Staphyloccous aureus* or *Escherichia coli* agents.

While the nature of the products produced by the process of this invention is not particularly dependent on the nature of the X ring or its substituents the full scope of this invention will be illustrated by concentrating illustrative examples in the pteridine series whose end products are known to have anti-folic acid or diuretic/antihypertensive activities. Similar reactions in various series containing other nuclei will be apparent from the examples provided.

The process of this invention comprises reacting an o-nitrosoamine (II) with an acylmethylene compound (I) in the presence of cyanide ions, preferably in excess, to give the desired 2-aminopyrazino heterocyclic end product (VII). It is believed that this novel process proceeds as follows:

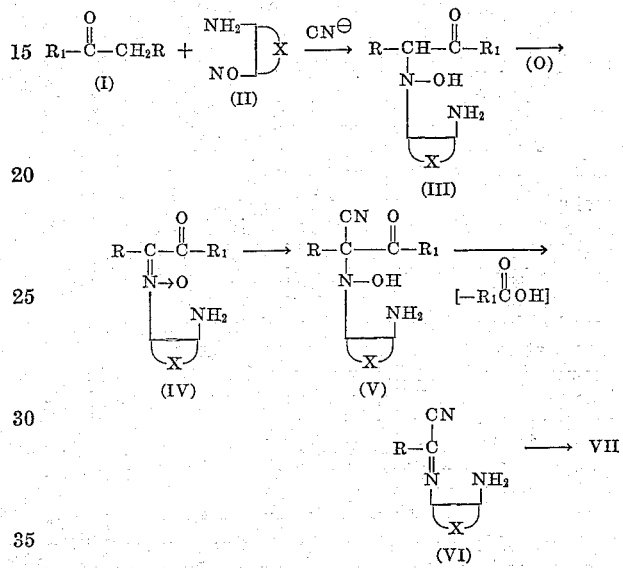

In the process the symbols R and X are as described hereabove. $R_1$ is, for example, an aryl, alkyl, carbalkoxy, or alkoxy, any of which have a maximum of 8 carbon atoms. Several of the $R_1$ moieties which are particularly useful are phenyl, nitrophenyl, trifluoromethylphenyl, halophenyl, lower alkyl, carbomethoxy, carbethoxy or lower alkoxy. Since an acyl moiety

is eliminated during the reaction, the specific character of the $R_1$ group is unimportant other than being readily available, chemically stable under the reaction conditions and sufficiently activating to make the adjacent methylene moiety reactive as described hereafter. One skilled in the art will recognize that the initial condensation of the α-methylene group of I with the nitroso radical of II will only occur if the methylene group is sufficiently activated. For example the starting materials represented by I are only operative if R is an electron withdrawing moiety such as an aryl group or carbamyl. The reaction will not work to high yields when R is lower alkyl, alkoxy, phenoxy or cycloalkyl. These compounds are prepared by a variation of this reaction as described below.

The novel aspects of this process apparently involve a novel autoxidation step, probably from the dihydronitrone (III) to the nitrone (IV), coupled with a novel cyclization with elimination of an acyl moiety

as the carboxylic acid.

The nitrone type intermediates are not usually isolated in the reaction but the 2-aminopyrazine heterocycle end product is immediately isolated in acceptable purity and yield. It should be noted that the reactivity of the methylene group of the acylmethylene starting material (I) and the nitroso group of the o-nitrosoamine (II) can be influenced by other substituents in their respective structures. For example in the exemplary pteridine series (see below), a 2-amino moiety ($R_2$) of a 2,6-diamino-5-nitrosopyrimidine starting material tends to deactivate the nitroso group because of the electropositive nature of the amine substituent. This effect can be compensated by using an electronegative moiety for $R_1$ in the acylmethylene compound (I) such as p-nitrophenyl, methoxy or carbomethoxy. While very high yields are realized using strongly electronegative groups at, either $R_1$ or $R_2$, or both, the reaction is operative under forcing conditions when electropositive groups are present such as amino for $R_2$ in structure X. Similar effects when described fully as hereabove will be apparent to one skilled in the art who can chose the desired reactants to prepare the sought 2-aminopyrazine heterocycles in the best possible yield.

Substantially equimolar quantities of the acylmethylene derivative (I) and the o-nitrosoamine (II) are reacted in a solvent in which the reactants are substantially soluble such as in a lower alkanol preferably ethanol, isopropanol or methanol, N,N-dimethylformamide, N,N-dimethylacetamide, aqueous mixtures thereof or the like. At least one molar equivalent of cyanide ions is essentially present but preferably an excess is used. An alkali metal cyanide ideally furnishes the desired cyanide ions. Sodium or potassium cyanides are most commonly used. The reaction is usually run at elevated temperatures for instance at from about 65° C. to the reflux temperature of the reaction mixture for from about ½ to about 24 hours. The preferred conditions are in methanol or ethanol solvent or aqueous mixtures thereof at reflux with an excess of cyanide ions for from about ½ to 16 hours. Other conditions have not been found to marked advantage except as described hereafter.

The starting materials are in all cases readily known and available or prepared by known methods. The o-nitrosoamines, for example, are generally prepared by nitrosating the amine. For example, see U.S. Pat. Nos. 2,963,481, 2,975,180, 2,963,479 and 2,963,478. It will also be apparent to one skilled in the art that in the phenyl and pyridyl series of starting materials simple unsubstituted o-nitrosoamines cannot be prepared either due to the lack of reactivity toward nitrosation of the aromatic nucleus or self-condensation. Nitrosoamines in these series necessarily must have another activating moiety such as an amino or hydroxyl group present. Exemplary of such available nitrosoamino starting materials are 2,4-diamino-1-nitrosobenzene, 2,4-diamino-5-methyl-1-nitrosobenzene, 2-amino-1-nitrosonaphthalene, 1-amino-2-nitrosonaphthalene all of which give 2-amino-pyrazine containing heterocycles having carcinogenic properties or having utility as dyestuff intermediates. A discussion of nitrosation of pyridines may be found in Heterocyclic Compounds, 14 II 481. In the preferred pyrimidine series the nitroso compounds are all readily prepared.

The acylmethylene compounds of Formula I are well known ketones which have essentially an α-substituent R which prevents elimination of water rather than an acyl moiety during cyclization (VI–V). It is an outstanding advantage of this process that the reaction uses a readily available ketone rather than an acylmethylene cyanide. Further details will be apparent from the examples.

A preferred and advantageous modification of the process of this invention is to form a pyridinium salt derivative of the acylmethylene derivative to be used as starting material. The use of a pyridinium salt derivative allows the formation of the nitrone intermediate by an elimination reaction without going through the rather slow autoxidation step. This preferred modification activates the methylene group of I and enables use of starting materials of the full scope and the previous definition of R. The reaction sequence of the aspect of the invention may be postulated as follows:

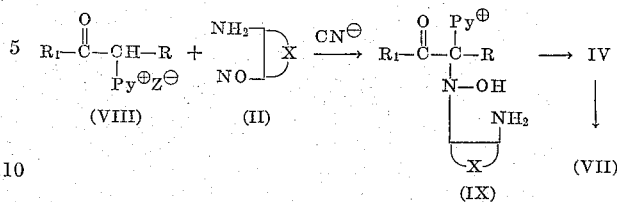

In this reaction sequence R, $R_1$ and X are as described hereabove with the additional proviso that none of the substituted moieties react with, or interfere with the formation of, the pyradinium intermediate (VIII); Py is any basic tertiary organic base capable of forming quaternary salts particularly the preferred pyridinium or those moieties derived from pyridine especially the lower alkyl substituted compounds such as picolinium, lutidinium, methylethylpyridinium, etc.; and Z is an anion capable of forming such a pyridinium salt, preferably chloride, bromide or iodide.

In practice a strongly activating group at R such as carbamyl may induce elimination of the $R_1CO$— moiety in situ before initial condensation of the pyridinium intermediate (VIII). The reaction conditions of this invention are identical to those described herebefore. The pyridinium starting materials (VIII) are well known to the art. Their preparation consists generally of monohalogenation of the acylmethylene parent (I) followed by reaction with an excess of the pyridine compound.

It has been found that reaction of the pyridinium salt (VIII) as starting material with the nitrosoamine is very fast and is carried out in very high yield. While the parent reaction initially described herein usually must undergo reaction for several hours for complete reaction, the pyridinium reaction is often substantially complete in a few minutes and with little heating such as at room temperature or with gentle heat. Ideally reaction conditions are up to 6 hours in duration at from about 25–100° C.

The scope of the process of this invention in preparing each of the heterocyclic systems will be readily apparent to one skilled in the art. The scope is exemplified by the following discussion in the very important 7-aminopyrimido[4,5-b] (pteridine) series. These compounds are particularly useful as diuretic or antihypertensive compounds or as intermediates for preparing such compounds. The scope is illustrated as follows:

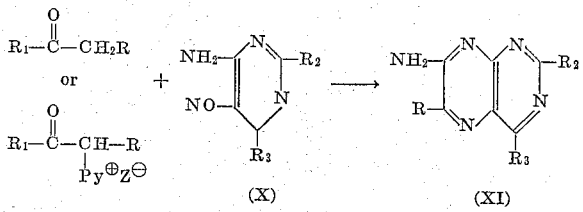

in which R, $R_1$, Py and Z are defined as above;

$R_2$ is aryl, amino, loweralkylamino, diloweralkylamino, cyclic amino such as piperidinyl, alkyl, hydrogen, hydroxy or alkylthio, all having a maximum of 8 carbon atoms. The preferred groups are phenyl, amino or lower alkylthio. The latter moiety is particularly useful as an intermediate for preparing the 2-amino derivatives by condensation with an excess of the desired amine such as ammonia with advanced temperatures in a closed system if necessary;

$R_3$ is an amino, loweralkylamino, diloweralkylamino, hydrogen, cyclic amino such as piperidino, alkyl, hydroxy or alkylthio, all having a maximum of 8 carbon atoms. Preferred is the amino moiety.

The reactions in preparing 7-aminopyrimido [4,5-b]-pyrazines using known 4-nitroso-6-aminopyrimidines are carried out under the same reaction conditions as described above.

The following terms as used therein and in the claims are defined as follows:

"Lower alkanol"—a straight or branched chain aliphatic alcohol having 1–6, preferably 1–3, carbon atoms. Methanol, ethanol or isopropanol are preferred.

"Alkyl"—straight or branched alkyl or cycloalkyl having a maximum of 8 carbon atoms.

"Lower alkyl"—straight or branched alkane having 1–6 carbon atoms, preferably 1–3.

"Aryl"—a cyclic organic residue containing only carbon, mono-sulfur, nitrogen or mono-oxygen as ring members of an aromatic system having a total maximum of 8 carbon atoms. The aromatic ring system may be substituted in well known "inert" substituents often referred to as "garbage radicals" which are nontoxic such as halogen, methyl, methoxy, trifluoromethyl, etc. Phenyl or thienyl are preferred.

"Lower alkoxy"—straight or branched alkyloxy having 1–6 carbon atoms, preferably 1–3.

"Alkali metal"—as commonly defined in the art with sodium, potassium or calcium cations preferred.

The following examples will make use of the process of this invention apparent to one skilled in the art and should not be construed as limiting the scope of this invention thereto.

Example 1

A mixture of 1.63 g. (0.01 mole) of benzoylacetamide, 1.0 g. (0.005 mole of 4,6-diamino-5-nitroso-2-phenyl-pyrimidine, 0.5 g. (0.01 mole) of sodium cyanide, 10 ml. of water and 40 ml. of ethanol is heated at reflux for 3 hours. Cooling gives 4,7-diamino-2-phenyl-6-pteridine-carboxamide.

Example 2

A mixture of 1.1 g. of 4,6-diamino-2-phenyl-5-nitroso-pyrimidine, 0.5 g. of sodium cyanide, 2.0 ml. of phenyl-acetone, 5 ml. of water and 15 ml. of ethanol is heated at reflux for one hour. The desired 4,7-diamino-2,6-diphenylpteridine separates during the heating and is isolated by cooling and filtration.

Example 3

A mixture of 2.4 g. of α-benzoyl-bromoacetamide, 2 ml. of pyridine and 20 ml. of absolute ethanol is heated briefly then added to a mixture of 1.2 g. of 4,6-diamino 5-nitroso-2-phenylpyrimidine, 0.5 g. of sodium cyanide, 10 ml. of water and 50 ml. of ethanol. Warming on a hot plate causes instantaneous reaction giving yellow crystals of 4,7-diamino-2-phenyl-6-pteridinecarboxamide.

Example 4

A mixture of 1 g. of propiophenone-α-pyridinium bromide (prepared from the halide by reaction with an excess of pyridine in alcohol), 0.3 g. of 4,6-diamino-5-nitroso-2-phenylpyrimidine, 0.19 g. of sodium cyanide and 20 ml. of aqueous methanol is heated at reflux for 4 hours. Cooling and concentration gives the desired 4,7-diamino-2-phenyl-6-methylpteridine.

Example 5

A mixture of 2.5 g. of ethyl α-bromo-phenylacetate, 2 ml. of lutidine and 50 ml. of methanol is warmed, then added to a warmed mixture of 1.6 g. of 2,4,6-triamino-5-nitrosopyrimidine, 0.7 g. of potassium cyanide and 50 ml. of aqueous isopropanol. The mixture is then heated at reflux for 48 hours. Evaporation, cooling and fractional crystallization gives 2,4,7-triamino-6-phenylpteridine.

Example 6

A mixture of 2.5 g. of ethyl β-α-keto-β-phenylpropionate is reacted with 1.5 g. of 2-methylthio-4,6-diamino-5-nitrosopyrimidine, 0.8 g. of sodium cyanide in 30 ml. of aqueous ethanol at reflux for 12 hours. Working up as described above gives 2-methylthio-4,7-diamino-6-phenyl-pteridine.

Example 7

A mixture of 4 g. of α-phenoxyacetophenone-α-pyridinium bromide (prepared as in Example 3), 2 g. of 4,6-diamino-2-methyl-5-nitrosopyrimidine and 1.2 g. of sodium cyanide in 75 ml. of aqueous ethanol is heated at reflux for one hour and cooled to give 4,7-diamino-6-phenoxy-2-methylpteridine.

Example 8

A solution of 2.3 g. of ethyl cyclohexylacetate in chloroform is brominated with one molar equivalent of bromine and converted to the methylethylpyridinium salt as in Example 3. The salt (1.2 g.) is reacted with 0.8 g. of 4,6-diamino-5-nitrosopyrimidine and 0.5 g. of sodium cyanide in aqueous ethanol for 16 hours to give 4,7-diamino-6-cyclohexylpteridine.

Example 9

A mixture of 3.2 g. of 3-nitroso-2,6-diamino-pyridine, 1 g. of sodium cyanide, 3 ml. of phenylacetone and 50 ml. of aqueous ethanol is heated at reflux for 12 hours then cooled to give the desired 2,7-diamino-3-phenyl-pyridopyrazine.

Example 10

A mixture of 1.5 g. of 2,4-diamino-1-nitroso-benzene, 2.3 g. of desoxybenzoin, 1 g. of sodium cyanide in 100 ml. of aqueous ethanol is heated at reflux for 12 hours. Cooling separates 2,7-diamino-3-phenylquinoxaline.

Example 11

A mixture of 1.2 g. of 2-amino-1-nitroso-naphthalene, 1.5 g. of propiophenone-α-pyridinium bromide (Example 1) and 0.2 g. of sodium cyanide in aqueous methanol are reacted as in Example 4 to give 2-amino-3-methylbenz-quinoxaline.

Example 12

Substituting the following reactants for those corresponding in either Example 1 or Example 3 in molar equivalents gives the following:

4,6-diamino-5-nitroso-2-hydroxypyrimidine plus p-nitropropionphenone-α-pyridinium bromide (prepared as in Example 4) gives 2-hydroxy-4,7-diamino-6-methyl-pteridine;

4,6 - diamino - 5-nitroso-2-(β-thienyl)-pyrimidine plus benzoylacetamide gives 4,7 - diamino - 2-(β-thienyl)-6-pteridinecarboxamide;

4,6-diamino-5-nitroso-2-phenylpyrimidine plus α-benzylacetophenone-α-pyridinium bromide (the bromo compound of which may be prepared by a Friedel-Crafts reaction using benzene and ω-phenyl-α-bromo-propionyl-bromide) gives 4,7-diamino-6-benzyl-2-phenylpteridine;

4,6-diamino-5-nitroso-2-(p-tolyl)-pyrimidine plus benzoylacetamide gives 4,7-diamino-2-(p-tolyl)-6-pteridine-carboxamide;

6 - amino - 4-methylamino-5-nitroso-2-phenylpyrimidine plus α-benzoylacetamide-α-pyridinium bromide gives 7-amino-4-methylamino-2-phenyl-6-pteridine-carboxamide;

2-amino-3-nitroso-6-hydroxypyridine plus phenylacetone gives 2-amino-3-phenyl-7-hydroxypyridopyrazine.

2,4-diamino-5-methyl-1-nitrobenzene plus phenylacetone gives 2,7-diamino-3-phenyl-6-methylquinoxaline;

2-amino-3-nitroso-6-hydroxypyridine plus phenylacetone gives 2-amino-3-phenyl-7-hydroxypyridopyrazine.

What is claimed is:
1. A process for perapring a heterocyclic compound of the structure:

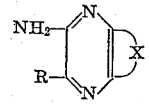

in which R is a member selected from the group consisting of lower alkyl, cyclohexyl, cyclopentyl, phenyl, thienyl, lower alkoxy, phenoxy and carbamyl; and X is a condensed aromatic residue which, when taken together with the two carbon atoms to which it is attached, is a member of the group consisting of phenylene, naphthylidene, pyrimidinediyl and pyridinediyl; comprising reacting an acylmethylene compound having a structure selected from the group consisting of:

(1)
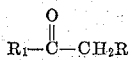

in which $R_1$ is a member selected from the group consisting of phenyl, lower alkyl, carbo-lower-alkoxy and lower alkoxy, and R is a member selected from the group consisting of thienyl, phenyl and carbamyl; and (2)
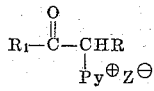

in which $R_1$ is as described herebefore, R is a member selected from the group consisting of thienyl, phenyl, carbamyl, lower alkyl, phenoxy, lower alkoxy and cyclohexyl, Py is a pyridinium moiety and Z is an anion selected from the group consisting of bromide, chloride and iodide, with an o-nitrosoamine of the structure:

in which X is as defined herefore in the presence of cyanide ions.

2. The process of claim 1 characterized in that X taken with the two carbon atoms to which it is attached is pyrimidinediyl.

3. The process of claim 1 characterized in that the reaction is run at from room temperature up to the reflux temperature of the reaction mixture and in an aqueous lower alkanol solvent.

4. The process of claim 1 characterized in that X taken with the two carbon atoms to which it is attached is phenylene substituted by a minimum of one member selected from the group consisting of amino and hydroxyl.

5. The process of claim 1 characterized in that X taken with the two carbon atoms to which it is attached is pyridinediyl substituted by a minimum of one member selected from the group consisting of amino and hydroxyl.

6. A process for preparing a 4,7-diamino-6-pteridine-carboxamide comprising reacting α-benzoylacetamide-α-pyridinium bromide with a 4,6-diamino-5- nitrosopyrimidine in the presence of cyanide ions.

7. A process for preparing 4,7-diamino-6-pteridine-carboxamide comprising reacting benzoylacetamide with a 4,6-diamino-5-nitrosopyrimidine in the presence of cyanide ions.

8. A process for preparing 4,7-diamino-2- phenyl-6-methylpteridine comprising reacting propiophenone-α-pyridinium bromide with 4,6-diamino-5-nitroso-2-phenyl-pyrimidine in the presence of cyanide ions.

References Cited in the file of this patent

Timmis: Nature, vol. 164 (1949), p. 139.
Osdene et al.: Chemistry and Industry (1954), pp. 404–6.